H. E. TWITO.
CORN PLANTER.
APPLICATION FILED JAN. 4, 1916.
1,189,019.
Patented June 27, 1916.
4 SHEETS—SHEET 1.
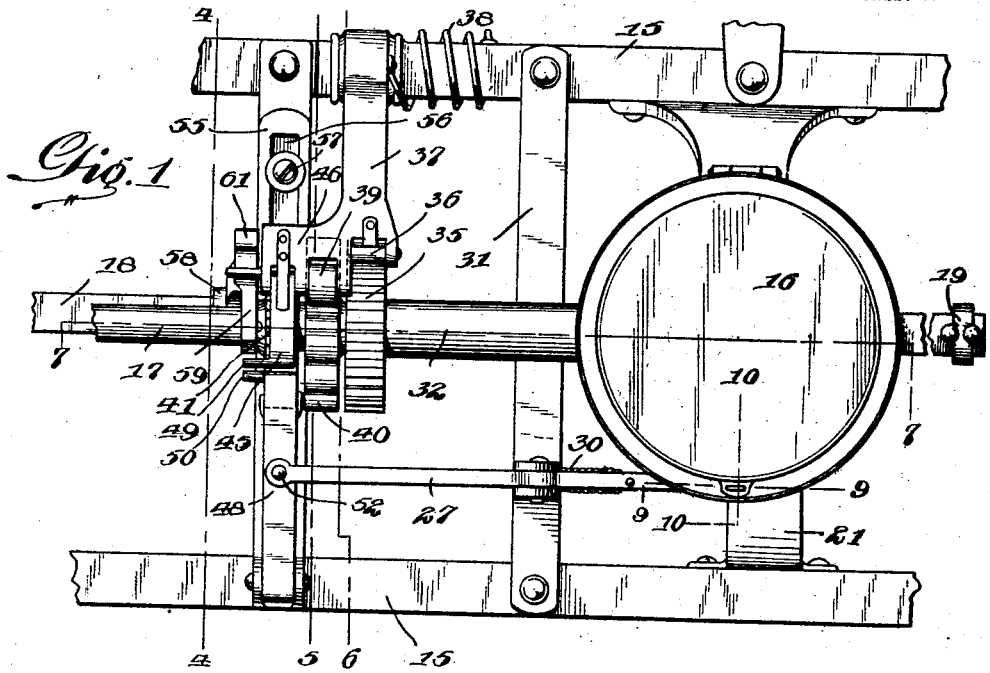
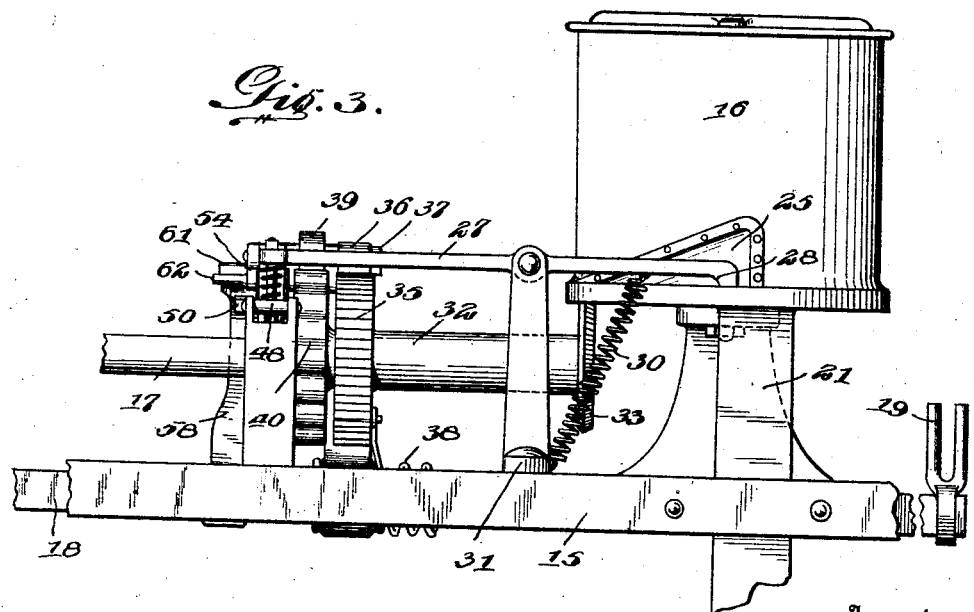
Inventor
Hans E. Twito.
Witnesses
Frederick L. Fox.
By Victor J. Evans.
Attorney

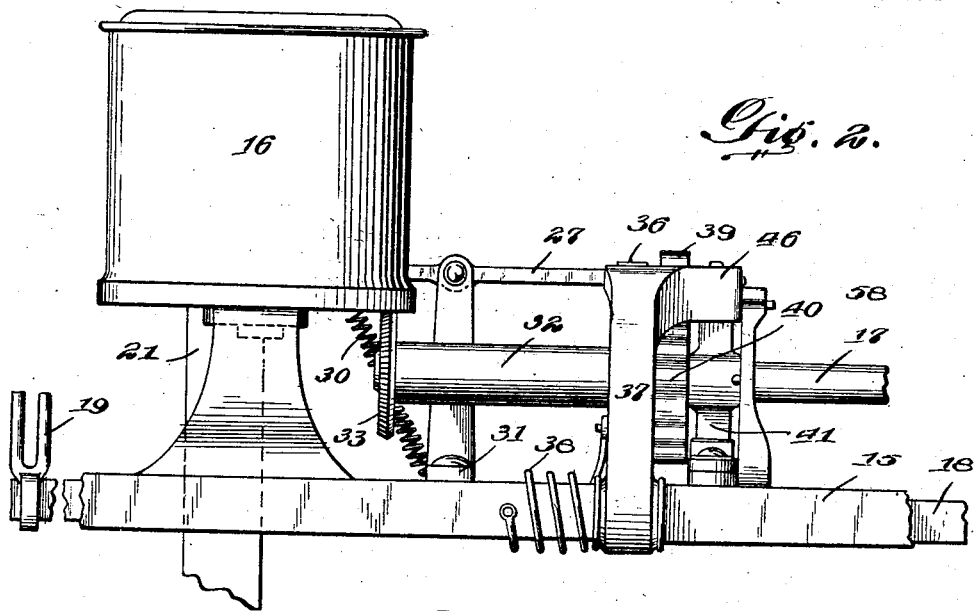

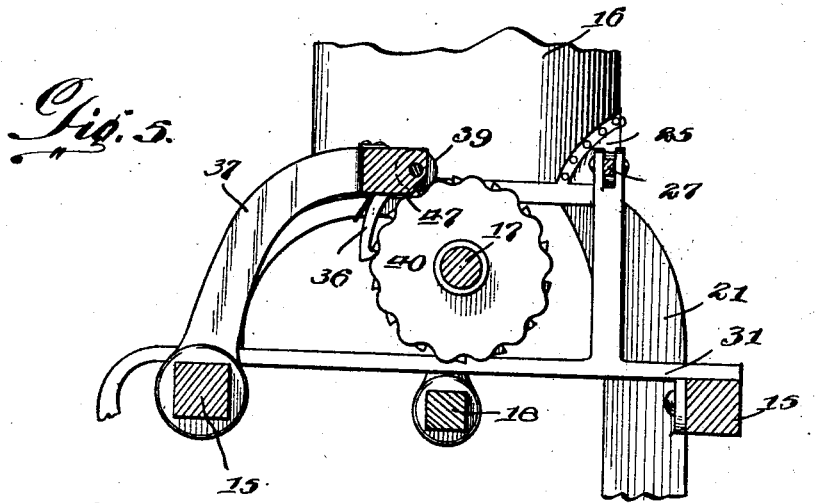
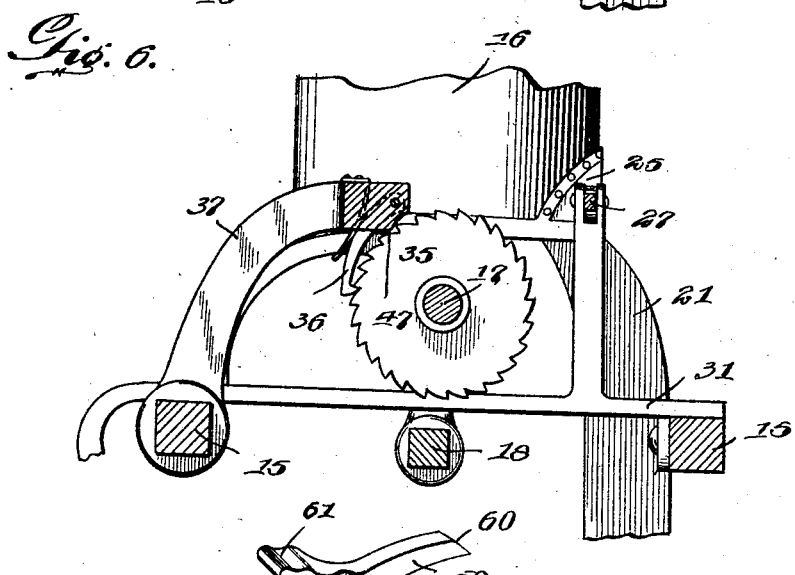
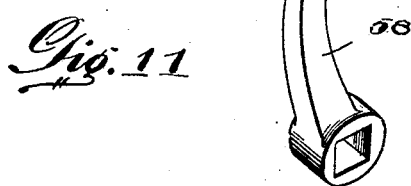

H. E. TWITO.
CORN PLANTER.
APPLICATION FILED JAN. 4, 1916.
1,189,019.
Patented June 27, 1916.
4 SHEETS—SHEET 4.
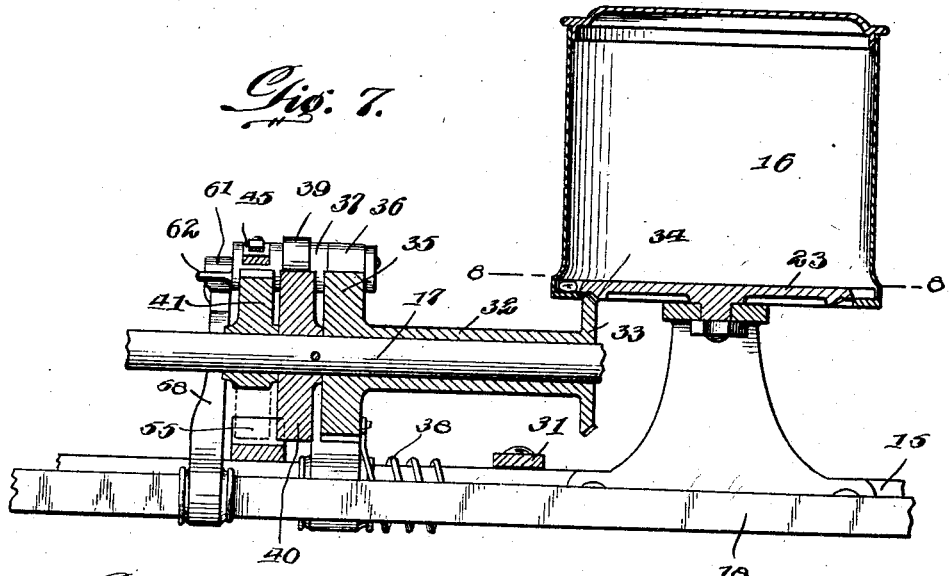
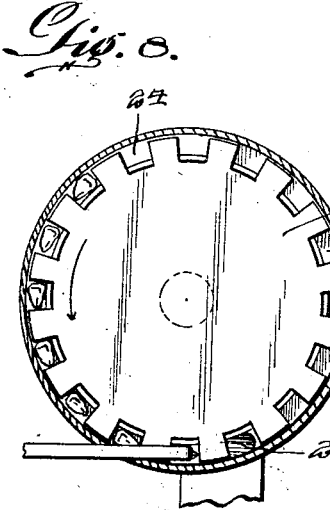
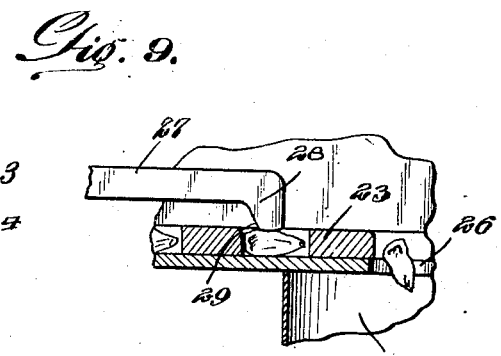
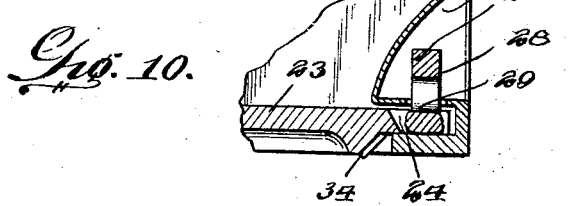

UNITED STATES PATENT OFFICE.

HANS EDMEN TWITO, OF LAKE MILLS, IOWA.

CORN-PLANTER.

1,189,019.  Specification of Letters Patent.  Patented June 27, 1916.

Application filed January 4, 1916. Serial No. 70,145.

*To all whom it may concern:*

Be it known that I, HANS EDMEN TWITO, a citizen of the United States, residing at Lake Mills, in the county of Winnebago and State of Iowa, have invented new and useful Improvements in Corn-Planters, of which the following is a specification.

This invention relates to corn planters, and it has particular reference to the seed feeding mechanism. In a corn planter it is highly important that an exact predetermined number of seeds be planted in each hill, or at each operation. Under different conditions and in different kinds of soil, the number of seeds constituting a charge varies, and corn planters have been constructed with the particular object in view of planting in each hill an exact number of seeds and also of varying the number according to circumstances. Heretofore, however, machines constructed for this purpose have been defective because at times the seeds or grains of corn will fail to enter into the seed cells or compartments, thereby reducing the number of seeds in the charge. In order to secure the proper crop results recourse must then be had to replanting which is expensive and which does not always result in the maturing of the plants at the proper time.

The present invention has for its object to produce a simple and improved mechanism whereby a predetermined number of seeds to constitute a charge will be segregated before being deposited with practical infallibility.

A further object of the invention is to produce a simple and improved mechanism whereby the failure of a seed to enter into the seed cell or compartment whereby it is to be conveyed to the place where the requisite number of seeds to constitute a charge is segregated will result in the temporary interruption of the counting mechanism which has been previously set to count off a predetermined number of seeds.

A further object of the invention is to simplify and improve the general construction, arrangement and operation of the parts constituting the improved device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view illustrating that part of a corn planter to which the invention is applied. Fig. 2 is a front elevation of the same. Fig. 3 is a rear view. Fig. 4 is a transverse sectional view taken on the line 4—4 in Fig. 1. Fig. 5 is a sectional view taken on the line 5—5 in Fig. 1. Fig. 6 is a sectional view taken on the line 6—6 in Fig. 1. Fig. 7 is a sectional view taken on the line 7—7 in Fig. 1. Fig. 8 is a horizontal sectional detail view taken on the line 8—8 in Fig. 7. Fig. 9 is a sectional view taken on the line 9—9 in Fig. 1. Fig. 10 is a sectional view taken on the line 10—10 in Fig. 1. Fig. 11 is a perspective detail view of the arm 58 detached.

Corresponding parts in the several figures are denoted by like characters of reference.

In the drawings there has been shown a portion of a runner frame 15 of an ordinary two-row corn planter, only one end of said runner frame being shown, the same supporting a seed box or hopper 16, it being understood that the mechanism of the invention is to be duplicated at the other end of the runner frame where another seed box, not shown, is supported. 17 is the drive shaft which is constantly driven in the customary manner by power transmitted from the main frame of the planter, said shaft being supported for rotation on the runner frame, which latter also supports the check rod 18, the latter being rocked at predetermined intervals by engagement of its fork 19 with the buttons or tappets of the check row wire, not shown. The parts thus far described, as well as the runner 20 and the seed tube or duct 21 having the foot valve 22 and the means for actuating said foot valve, are common in all modern corn planters, and the construction and operation of said parts is well understood and need not be described in detail. The hopper 16 contains the customary feed plate 23 having the cells 24 each adapted to contain a grain or kernel of corn. The wall of the hopper has an indent 25 through which a portion of the feed plate is exposed, said indent serving also as a cut-off for segregating the grains of corn that are to be carried to the seed tube 21, the upper end of which communicates with the feed plate through an opening 26 in the bottom of the hopper.

The runner frame includes cross bars one of which supports a lever 27 which may be termed the feeler, said lever having at one end a shoe 28 which rides on the surface of that portion of the feed plate which is exposed through the indent 25, said shoe engaging the cells 24, and said shoe having a beveled edge 29 so that while said shoe is free to drop into the cells when the latter are empty, it will not interfere with the rotation of the feed plate. A spring 30 connecting the feeler 27 with a cross bar 31 serves to maintain the shoe 28 in engagement with the feed plate.

Mounted for rotation on the driven shaft 17 is a sleeve 32 having at one end a pinion 33 meshing with a bevel gear 34 formed on the feed plate. The other end of the sleeve 32 carries a ratchet wheel 35 which is engaged by a spring actuated dog or pawl 36 carried by an arm 37 which is mounted for rocking movement on the runner frame, said arm being actuated by a spring 38. The spring actuated arm 37 also carries an anti-friction member, such as a roller 39, which is normally held in engagement with the surface of a cam wheel 40, the latter being fixed on the driven shaft 17, and said cam wheel having an undulating surface, by the action of which a high frequency rocking movement will be imparted to the arm 37 when the machine is in operation. It follows that by each rocking movement of the arm 37 the ratchet wheel 35 will be advanced the space of one tooth, and the parts are so arranged and proportioned that the advancement of one tooth of the ratchet wheel 35 will advance the feed plate 23 the space of one cell.

Loosely mounted on the driven shaft 17 adjacent to the cam wheel 40 is the key wheel or segment 41, said segment having on the surface thereof a plurality of ratchet teeth 42 and a projection or wedge member 43. The key segment, the ratchet teeth of which are disposed oppositely to those of the ratchet wheel 35, is retracted by a spring 44 against the action of a spring actuated pawl 45 which is carried by the rocking arm 37. The head 46 of said rocking arm which carries the pawls 36, 45 and the roller 39 is provided on its under face with a beveled projection 47 adapted to be engaged by the wedge member 43 of the key segment. The teeth of the latter are engaged by a dog 48, whereby the key segment is held against the action of the retracting spring 44 while the pawl 45 advances over the respective teeth. The pawl 45 and the dog or detent 48 are each provided with a laterally extending finger designated, respectively, by 49, 50, the purpose of which will be hereinafter described. The detent 48 has an aperture 51 for the passage of a pin or bolt 52 depending from the feeler 27, said bolt having a nut 53 adjustably engaging the under face of the detent. A spring 54 coiled about the pin or bolt 52 between the feeler 27 and the detent 48 exerts a downward pressure on the latter whereby it is forced resiliently in engagement with the teeth of the key segment.

The extent to which the key segment may be retracted by the spring 44 is governed by a stop member 55 which may be in the nature of a slide adjustably mounted on the runner frame. The slide may be secured in adjusted position by means of a bolt 56 extending through a slot 57 therein. It is desired to be understood, however, that no limitation is made to any particular means for adjusting and retaining the slide or stop member 55; in an organized two-row corn planter it will be understood that there are two such slides which might well be adjusted simultaneously by means provided for the purpose.

Mounted securely on the check rod 18 is an arm 58 having a head portion which includes a forwardly extending bracket 59 the forward end of which is beveled, as shown at 60, and an upwardly extending beveled lug 61, the latter adapted to engage a contact member 62 that extends laterally from the head 46 of the rocking arm 37.

The teeth 42 of the key segment 41 correspond with the teeth of the ratchet wheel 35, so that whenever the latter is advanced one space by the action of a pawl carried by the rocking arm 37, the key segment will likewise be advanced the space of one tooth against the action of the retracting spring 44. The number of ratchet teeth 42 on the key segment 41 should be at least equal to the maximum number of seeds that it may be desired to plant at a single operation. It is, moreover, essential that the parts of the device be so arranged and proportioned that the feed plate may be advanced a number of steps in excess of the maximum number of seeds that it may be desired to deposit at a single charge in the interval between two operations of the dropping mechanism which is actuated by the intermittently operable check rod.

In setting the device for operation, the stop member 55 is first adjusted to permit the key segment to be retracted by the spring 24 with respect to the pawl 45 and the detent 48 a number of teeth equal to the number of seeds or kernels that it is desired to drop at one charge. This will cause the wedge member 43 to be correspondingly spaced from the beveled lug 47, it being understood that the latter will be engaged by the wedge member concurrently with the engagement of the last tooth of the key segment by the detent 48. The machine being in motion, the cam wheel 40 will be constantly driven, the undulating surface thereof engaging the roller 39 and, therefore, producing a rocking movement of the arm 37 which results in the ratchet wheel 35 being advanced the space of one tooth and the feed plate being advanced the space of one cell by each rocking movement of said arm. The tendency will likewise be for the key segment to be advanced the space of one tooth against the tension of the spring 44 by each operation of the rocking arm. This, however, will be subject to the operation of the feeler 27, the shoe of which rides over the cells of the feed wheel. As long as each cell contains a grain of corn, the feeler will remain practically stationary. Assuming, however, that a cell has failed to receive a grain of corn, the shoe of the feeler will drop into such cell, causing the feeler to be rocked under the tension of the spring 30, and thus lifting the detent 48 out of engagement with the teeth of the key wheel. The latter, while being rocked by the action of the pawl 45, will, therefore, not receive feed movement but will be retracted by the action of the spring 44. As the feed plate moves another step, the beveled shoe of the feeler will be engaged by the wall of the cell and be thereby restored to its initial position against the tension of the spring 30. Thus, as often as an empty cell passes beneath the shoe of the feeler, the feed motion of the key segment will be interrupted. As above stated, the parts of the device are so proportioned that a reasonable number of such interruptions may occur in the intervals between the feeding of seeds.

When the requisite predetermined number of seeds have been fed to constitute a charge, the number being governed by the number of teeth of the key segment exposed between the pawl 45 and the wedge member 43 at the time when said key segment is fully retracted by the spring 44 into engagement with the stop 55, the operation of the feed disk must be temporarily interrupted. This interruption is accomplished by the wedge member 43 engaging the beveled lug 47 on the underside of the head 46 of the rocking arm 37, and it is preferably timed to take place at the moment when the roller 39 is at the highest point of one of the undulations of the cam surface of the wheel 40. The wedge member 43 striking the lug 47 will lift the latter, thereby tilting the rocking arm 37 against the tension of the spring 38 and supporting it against return movement under the impulse of said spring. The rocking movement of the arm 37 being thus interrupted, it follows that the movement of the ratchet wheel 35 and of the seed plate will, likewise, be interrupted, although the rotation of the cam wheel 40 is continued. In this relative position the parts remain until the check rod 18 is rocked. The arm 58 will now swing upward into engagement with the laterally extending fingers 49, 50 of the pawl 45 and the detent 48, the upward projection 61 of the head portion of said arm simultaneously engaging the contact member 62. The pawl 45 and detent 48 being thus simultaneously raised from engagement with the toothed surface of the key segment, the latter will be instantly retracted by the spring 44, the retracting movement being limited by the stop member 55 and the wedge member 43 being moved out of the path of the lug 47. As is well understood, the motion of the check rod is a rocking one, said check rod being retracted in the customary manner by a spring, not shown, but which is sufficiently powerful for the purpose. The arm 58, having accomplished its purpose of releasing the key segment and permitting the retraction or resetting of the latter, is thus restored to its initial out-of-the-way position, permitting the rocking arm 37 to be again projected by the spring 38, and thus causing the feed operation to be resumed.

It will be seen that by the mechanism herein described the feed plate will not merely be moved a predetermined number of steps during the intermission between the operations of the seed dropping mechanism, but that if for any reason a grain of corn should fail to enter any one of the seed cells, the operation of the key segment which governs the number of seeds contained in a charge will be interrupted, provision being made for a reasonable number of such interruptions during the period required to segregate a charge. It thus follows that failure of a seed to enter into a cell will not reduce the full charge unless such failure should occur an unreasonable or unusual number of times during each period, which is not liable to happen. It may, therefore, be safely asserted that by my present invention means are provided whereby the number of seeds in each charge will be regulated with practical infallibility.

Having thus described the invention, what is claimed as new, is:—

1. In a corn planter, a revolving feed plate having seed cells, means for imparting to said plate a step by step rotary motion, said means including a pawl carrying rocking arm and a ratchet wheel actuated thereby, means for interrupting the feed motion at a predetermined time, said means including a toothed spring retracted key segment operable in conjunction with the ratchet wheel by the pawl carrying arm, a detent-dog engaging the toothed face of the key segment, and means for disengaging the detent from the key segment, said means including a feeler spring pressed in the direction of the cells of the feed plate.

2. In a corn planter, a movable feed plate having seed cells, means for intermittently actuating the feed plate to advance the cells step by step, means for interrupting the feed motion at a predetermined time, said means including a key member operable step by step in conjunction with the feed motion, and means for interrupting the advance of the key member independently of the feed motion.

3. In a corn planter, a movable feed plate having seed cells, means for intermittently actuating the feed plate to advance the cells step by step, means for interrupting the feed motion at a predetermined time, said means including a spring retracted key member operable step by step in conjunction with the feed motion, and means for interrupting the advance of the key member against the tension of its retracting spring independently of the feed motion.

4. In a corn planter, a movable feed plate having seed cells, means for intermittently actuating the feed plate to advance the cells step by step, means for interrupting the feed motion at a predetermined time, said means including a key member operable step by step in conjunction with the feed motion, a rocking arm having pawls independently actuating the feed motion and the key member, and means for interrupting the advance of the key member independently of the feed motion.

5. In a corn planter, a movable feed plate having seed cells. means for intermittently actuating the feed plate to advance the cells step by step, means for interrupting the feed motion at a predetermined time, said means including a key member operable step by step in conjunction with the feed motion, a rocking arm having pawls independently actuating the feed motion and the key member, and means for interrupting the advance of the key member independently of the feed motion, said means including a movably supported feeler, spring pressed in the direction of the seed cells to engage such of said cells as are empty of seed.

6. In a corn planter, a movable feed plate having seed cells, means for intermittently actuating the feed plate to advance the cells step by step, means for interrupting the feed motion at a predetermined time, said means including a key member operable step by step in conjunction with the feed motion, a rocking arm having pawls independently actuating the feed motion and the key member, and means for interrupting the advance of the key member independently of the feed motion, said means including a rocking spring actuated feeler having a beveled shoe lying in the path of the seed cells to engage such cells as are empty of seed, thereby causing the feeler to rock, and a key-member-engaging detent actuated by the rocking movement of the feeler.

7. In a corn planter, means including a movably supported intermittently operable feed plate having cells for segregating, one by one, a predetermined number of seeds to constitute a charge, means for actuating the feed plate, a pivotally supported spring retracted key member, means for advancing said key member step by step in conjunction with the feed motion, means carried by the key member for interrupting the operation of the feed motion when a predetermined number of seeds have been segregated, and means for interrupting the advance of the key member against the tension of its retracting spring when the mechanism for segregating seeds, one by one, fails to function.

8. In a corn planter, means including a movably supported intermittently operable feed plate having cells for segregating, one by one, a predetermined number of seeds to constitute a charge, means for actuating the feed plate, a pivotally supported spring retracted key member, means for advancing said key member step by step in conjunction with the feed motion, means carried by the key member for interrupting the operation of the feed motion when a predetermined number of seeds have been segregated, and means for interrupting the advance of the key member against the tension of its retracting spring when the mechanism for segregating seeds, one by one, fails to function, said means including a movably supported spring actuated feeler having a shoe lying in the path of the seed cells to engage such cells when empty, and a key-member-engaging detent actuated by the feeler.

9. In a corn planter, a movably supported feed plate having seed cells, means for intermittently actuating said plate to advance the cells step by step and to segregate, one by one, a predetermined number of seeds to constitute a charge, a pivotally supported spring retracted key member having a toothed surface, a rocking arm having pawls to actuate the feed motion and the key member, means for interrupting the feed motion when a predetermined number of seeds have been segregated, said means including interengaging members on the rocking arm and on the key member, adjustable means for for limiting the movement of the key member under the impulse of the retracting spring, and means for interrupting the advancing movement of the key member when the seed feeding mechanism fails to function.

10. In a corn planter, a movable supported feed plate having seed cells, means for intermittently actuating said plate to advance the cells step by step and to segregate, one by one, a predetermined number of seeds to constitute a charge, a pivotally supported spring retracted key member having a toothed surface, a rocking arm having pawls to actuate the feed motion and the key member, means for actuating the rocking arm including a constantly revolving wheel having an undulating cam surface and an anti-friction member carried by the rocking arm in engagement with said cam surface, means for interrupting the feed motion when a predetermined number of seeds have been segregated, said means including interengaging members on the rocking arm and on the key member, adjustable means for limiting the movement of the key member under the impulse of the retracting spring, and means for interrupting the advancing movement of the key member when the seed feeding mechanism fails to function.

11. In a corn planter, a seed feeding mechanism for segregating, one by one, a predetermined number of seeds to constitute a charge, a movably supported spring retracted key member controlling the number of seeds to constitute a charge, means for advancing the key member step by step in conjunction with the feed motion, each advance of the key member being coincident with the segregation of a seed kernel, means for interrupting the advance of the key member when the seed segregating means fails to function, and means carried by the key member for interrupting the feed motion when a predetermined number of seeds have been segregated.

12. In a corn planter, a revolubly supported feed plate having seed cells, means for intermittently actuating the feed plate to advance the cells step by step, said means including a ratchet wheel, a pivoted spring retracted key member having a toothed surface, means for limiting the movement of the key member against the action of its retracting spring, a rocking arm having pawls engaging the ratchet wheel and the toothed face of the key member to actuate the same conjointly, a detent engaging the toothed face of the key member, said detent and the pawl engaging the key member having laterally extending fingers, a rocking check rod, and an arm carried by said check rod, said arm having a head portion adapted to engage the lateral fingers of the pawl and the detent to disengage the same from the toothed face of the key member, permitting the same to be reset by its retracting spring.

13. In a corn planter, a revolubly supported feed plate having seed walls, means for intermittently actuating the feed plate to advance the cells step by step, said means including a ratchet wheel, a pivoted spring retracted key member having a toothed surface, means for limiting the movement of the key member against the action of its retracting spring, a rocking arm having pawls engaging the ratchet wheel and the toothed face of the key member to actuate the same conjointly, means for actuating the rocking arm including a constantly revolving wheel having an undulating cam surface, a roller carried by the rocking arm in engagement therewith, and an actuating spring for the rocking arm, a detent engaging the toothed face of the key member, said detent and the pawl engaging the key member having laterally extending fingers, a laterally extending contact member carried by the rocking arm, a rocking check rod, and an arm carried by said check rod, said arm having a head portion adapted to engage the lateral fingers of the pawl and the detent to disengage the same from the toothed face of the key member, permitting the same to be reset by its retracting spring, said head portion adapted to engage also the contact member carried by the rocking arm to swing the roller clear of the cam wheel.

14. In a corn planter having means for segregating a predetermined number of seeds to constitute a charge, a key member controlling the number of seeds, means for imparting to said key member a step by step movement concurrently with the step by step movement of the feed mechanism, and means for interrupting the advance of the key member when the feed motion fails to function.

In testimony whereof I affix my signature in presence of two witnesses.

HANS EDMEN TWITO.

Witnesses:
  T. S. TWEED,
  C. W. STINTEN.

Copies of this patent may be obtained for five cents each, by addressing the "Commissioner of Patents, Washington, D. C."